(12) United States Patent
Soda

(10) Patent No.: US 8,189,245 B2
(45) Date of Patent: May 29, 2012

(54) IMAGE FORMING APPARATUS, METHOD OF CONTROLLING SAME, AND STORAGE MEDIUM

(75) Inventor: Yuji Soda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 507 days.

(21) Appl. No.: 12/427,436

(22) Filed: Apr. 21, 2009

(65) Prior Publication Data

US 2009/0279150 A1  Nov. 12, 2009

(30) Foreign Application Priority Data

May 8, 2008 (JP) ................................ 2008-122624

(51) Int. Cl.
*G03F 3/08* (2006.01)
(52) U.S. Cl. ........ 358/518; 358/1.5; 358/1.12; 399/301; 347/116
(58) Field of Classification Search ............... 358/1.9, 358/518, 1.5, 1.12, 1.16, 1.17; 382/162, 382/167; 399/39, 301; 347/116, 177, 178, 347/232, 234, 243, 250, 252
See application file for complete search history.

(56) References Cited

U.S. PATENT DOCUMENTS

| | | | |
|---|---|---|---|
| 6,323,955 B1 * | 11/2001 | Kanai et al. ................... | 358/1.17 |
| 6,934,049 B1 * | 8/2005 | Yamada ......................... | 358/1.16 |
| 7,528,851 B2 * | 5/2009 | Yoshida ......................... | 347/116 |
| 7,843,604 B2 * | 11/2010 | Higashiyama et al. ........ | 358/1.9 |
| 8,005,321 B2 * | 8/2011 | Omori et al. ................... | 382/318 |
| 2004/0100550 A1 * | 5/2004 | Bannai et al. ................. | 347/232 |
| 2005/0219354 A1 * | 10/2005 | Omori et al. .................. | 347/250 |
| 2005/0264646 A1 * | 12/2005 | Izumiya et al. ............... | 347/243 |
| 2006/0222419 A1 * | 10/2006 | Ishibashi et al. .............. | 399/301 |
| 2006/0268340 A1 * | 11/2006 | Futami ......................... | 358/1.16 |
| 2008/0174799 A1 * | 7/2008 | Higashiyama et al. ........ | 358/1.9 |
| 2009/0067858 A1 * | 3/2009 | Ishibashi ......................... | 399/39 |
| 2009/0067893 A1 * | 3/2009 | Kurosawa ..................... | 399/301 |
| 2009/0225383 A1 * | 9/2009 | Soeda et al. ................. | 359/198.1 |
| 2010/0079774 A1 * | 4/2010 | Yamazaki ...................... | 358/1.5 |
| 2010/0103240 A1 * | 4/2010 | Ono et al. ..................... | 347/252 |

FOREIGN PATENT DOCUMENTS

| | | |
|---|---|---|
| JP | 2002-116394 | 4/2002 |
| JP | 2003-241131 | 8/2003 |
| JP | 2004-170755 | 6/2004 |
| JP | 2006-255958 | 9/2006 |

OTHER PUBLICATIONS

Office Action dated Dec. 28, 2010 in Korean Application No. 10-2009-0039642.

* cited by examiner

*Primary Examiner* — Kimberly A Williams

(74) *Attorney, Agent, or Firm* — Fitzpatrick, Cella, Harper & Scinto

(57) ABSTRACT

If an image is shifted in increments of pixels according to scan line changing points, the printed image suffers from jaggies or boundaries at positions corresponding to the scan line changing points. The jaggies or boundaries are also produced when a 1/2 speed or a 1/3 speed obtained by varying the process speed is used. Consequently, it has been impossible to obtain high-quality output images. An image forming apparatus is offered which has a printing unit operating to print at different process speeds and a control unit for controlling the output range of output image data for each line according to the process speeds. When the process speed in use is lower than a normal process speed, a part of 1 line of image data is outputted divisionally at timings at which lines from which image is not usually outputted at this low process speed are scanned.

7 Claims, 13 Drawing Sheets

CORRECTIVE PROCESSING

IMAGE PRODUCED PRIOR
TO SCAN LINE
CHANGING
PROCESSING

IMAGE PRODUCED AFTER
SCAN LINE
CHANGING
PROCESSING

↑
SCAN LINE
CHANGING POINT

IMAGE FORMING APPARATUS, METHOD OF CONTROLLING SAME, AND STORAGE MEDIUM

BACKGROUND OF THE INVENTION

1. Field of the Invention

The present invention relates to a color image forming apparatus and, more particularly, to a tandem color image forming apparatus equipped with plural color development means and transfer means for sequentially transferring images of plural colors formed by the plural color development means.

2. Description of the Related Art

In recent years, tandem color image forming apparatus have become widespread to create images at higher speed by electrophotographic color image forming apparatus. A tandem color image forming apparatus has as many developing units and photoconductor drums as color materials, an images of different colors are successively transferred onto a transfer belt and onto a recording medium. It is already known that plural factors cause misregistration in such a tandem color image forming apparatus. Various methods have been proposed to cope with each of such factors. One of the factors is that lenses used in a deflection and scanning device are not uniform. Another factor is that the lenses deviate from their proper installation positions. A further factor is that the position at which the deflection and scanning device is installed to the body of the color image forming apparatus deviates from its proper position. In this case, each scanning line is tilted or curved. The degree of the tilt or curvature differs according to different color. Consequently, misregistration takes place.

A method of coping with the misregistration is described in Japanese Patent Laid-Open No. 2002-116394. In particular, during the step of assembling a deflection and scanning device, the magnitude of the curvature of each scanning line is measured using an optical sensor. The lens is mechanically rotated to adjust the curvature of the scanning line. Then, the lens is bonded with adhesive.

Japanese Patent Laid-Open No. 2003-241131 describes a method of installing a deflection and scanning device to the body of a color image forming apparatus by measuring the degree of the tilt of each scanning line using an optical sensor during the step of installing the deflection and scanning device to the body, mechanically tilting the deflection and scanning device to adjust the tilt of the scanning line.

Japanese Patent Laid-Open No. 2004-170755 describes a method of creating a corrected image by measuring the tilt and the magnitude of the curvature of each scanning line using an optical sensor and correcting bitmap image data such that the tilt and curvature are canceled out.

The method described in Japanese Patent Laid-Open No. 2004-170755 makes corrections by image-processing image data and, therefore, mechanical adjusting members and an adjusting step normally performed during assembly are dispensed with. In these respects, the method can cope with misregistration more economically than the methods described in the above-cited Japanese Patent Laid-Open Nos. 2002-116394 and 2003-241131.

The correction to misregistration using the image processing is carried out when the scanning beam deviates in the vertical scanning direction as shown in FIG. 12. In the method described in the above-cited Japanese Patent Laid-Open No. 2004-170755, the tilt and curvature of each scanning line in the outputted matter are canceling out by creating a shifted image from the original image at each position (herein may be referred to as the scan line changing point) like an image obtained by scan line changing processing illustrated in FIG. 13.

However, the aforementioned conventional example has the following problems. First, a bitmap image printed with a printer is corrected by image processing as a premise. Therefore, it is necessary to form a bitmap image complying with the tilt and curvature of the optical system of the print engine.

At this time, the image is shifted in increments of pixels in a corresponding manner to scan line changing points. Consequently, there is the problem that jaggies or boundaries are produced at locations corresponding to the scan line changing points in the printout.

Jaggies and boundaries are also produced even at 1/2 speed and 1/3 speed obtained by varying the process speed. Hence, it has been impossible to produce good output images.

A method consisting of creating an image at enhanced resolution is available to solve the foregoing problem. Where the resolution is enhanced, a large capacity of memory is necessary to process the enhanced resolution. This produces various problems including increased costs and performance deterioration.

SUMMARY OF THE INVENTION

The present invention in its first aspect provides an image forming apparatus. The image forming apparatus associated with the invention has: a storage unit configured to store data indicating amounts of tilt and curvature of an optical system for each color; a first computational unit configured to calculate an amount of misregistration from the data indicating the amounts of tilt and curvature of the optical system for each color; a second computational unit configured to calculate a transfer point in a bitmap image based on the amount of misregistration calculated by the first computational unit; a converter configured to convert output image data according to the transfer point; a printing unit configured to print the output image data converted by the converter at different process speeds; and a control unit configured to control an output range of the output image data for each line according to the process speeds. At process speeds lower than a normal process speed, a part of one line of image data is divisionally outputted.

The present invention in its second aspect provides an image forming method. It is desired that the divisionally outputted image data be in a range located between the aforementioned transfer point and a point existing ahead of or behind the transfer point.

The present invention in its third aspect provides a computer-readable recording medium. Furthermore, in the invention described above, it is desired that the divisionally outputted image data be in a range lying around the transfer point.

A method associated with the invention to control an image forming apparatus starts with causing data indicating amounts of tilt and curvature of an optical system to be stored in memory for each color. An amount of misregistration is calculated from the data indicating the amounts of tilt and curvature of the optical system for each color. A transfer point in a bitmap image is calculated based on the calculated amount of misregistration. Output image data is converted according to the transfer point. The converted output image data are printed at different process speeds. The output range of the output image data is controlled for each line according to the process speeds. At process speeds lower than a normal process speed, a part of one line of image data is divisionally outputted.

In the invention described above, it is desired that the divisionally outputted image data be in a range located between the aforementioned transfer point and a point existing ahead of or behind the transfer point.

Furthermore, in the invention described above, it is desired that the divisionally outputted image data be in a range lying around the transfer point.

Processing performed by the above-described method of controlling the image forming apparatus can be carried out by a program to be executed by a computer. The method can be implemented by the computer by reading the program into the computer. Furthermore, the program can be read into the computer via a computer-readable storage medium on which the program is recorded.

According to the present invention, the disadvantage with the conventional scan line changing point that would have been heretofore produced in the image by correcting tilt and curvature of an optical system by correcting the original image can be suppressed by the use of low process speeds.

Especially, when printing is performed on thick paper, coated paper being special paper, glossy film, and OHP sheets providing poor fixability and requiring a low process speed, good-quality images in which jaggies and boundaries are suppressed can be printed out while maintaining the low process speed.

Further features of the present invention will become apparent from the following description of exemplary embodiments (with reference to the attached drawings).

DESCRIPTION OF THE EMBODIMENTS

Embodiments of the present invention are hereinafter described with reference to the accompanying drawings.

Embodiment 1

Figure 1:
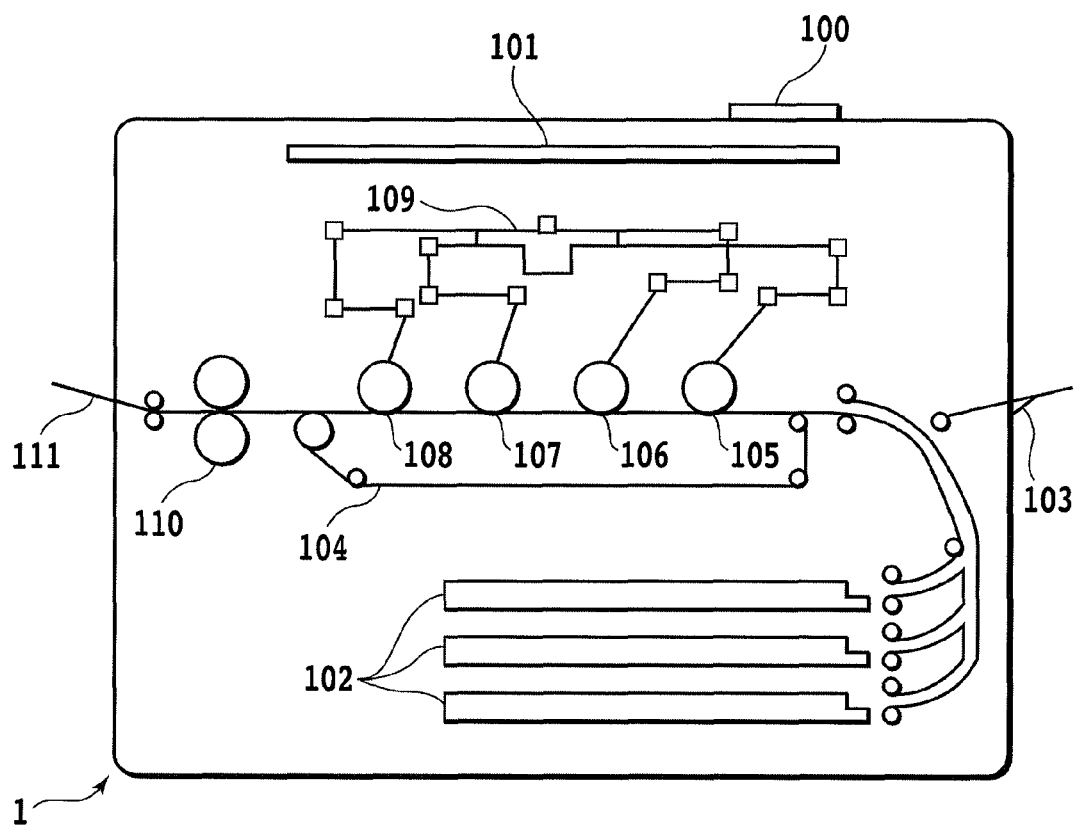
FIG. 1 is a conceptual view of the body of a printer to which the invention can be applied.

FIG. 1 is a conceptual diagram showing a printer according to the invention.

The structure of a laser beam printer acting as the printer 1 shown in FIG. 1 is particularly described in the following.

In FIG. 1, the body of the printer is indicated by reference numeral 1 and capable of receiving and storing compressed image data supplied from a host computer connected with the outside. The printer body 1 has a function of forming an image on paper, which is a recording medium, while decompressing the compressed image data.

Switches for various operations, an LED display, and other devices are arranged on a control panel 100. A printer control unit (controller) 101 controls the whole printer 1 and analyzes character information supplied from the host computer or the like. The printer control unit 101 principally operates to convert the character information into a corresponding image signal indicative of a character pattern or to decompress the compressed image data and transfer the decompressed image data to a laser scanner unit 109.

When printing is started, the printer 1 starts an operation for feeding paper into the printer from any one of paper feeding cassettes 102 or from a manual feeding tray 103. The paper fed in this way is sent to a paper feeding unit 104, and then transported through development units 105, 106, 107, and 108 in turn. At the same time, sets of image data decompressed for each color by the controller 101 are subjected to image conversion processing and then sent to the laser scanner unit 109.

The laser scanner unit 109 is a circuit for driving a semiconductor laser and turns on and off the emission of laser light from the semiconductor laser in response to entered image data. For each color represented by the image data sent to the laser scanner unit 109, photoconductor drums for the development units 105, 106, 107, and 108, respectively, are scanned with the laser light based on the image data. Desired images of the individual colors are formed on the respective photoconductor drums. Formation of the sets of image data for the individual colors is synchronized with the conveyance of the paper. As a result, the images of the individual colors are developed on the paper transported by the paper feeding unit 104.

Sensors for detecting the remaining amounts of toners are attached to the development units 105, 106, 107, and 108. Information from the sensors is sent to the controller 101 as the amounts of the toners decrease.

The color images are thermally fixed to the paper by a fixing unit 110 and then sent out into a output tray 111.

Because of the structure of the printer 1 described so far, each color of image can be developed independently and, therefore, very high speed printing can be achieved.

Figure 2:
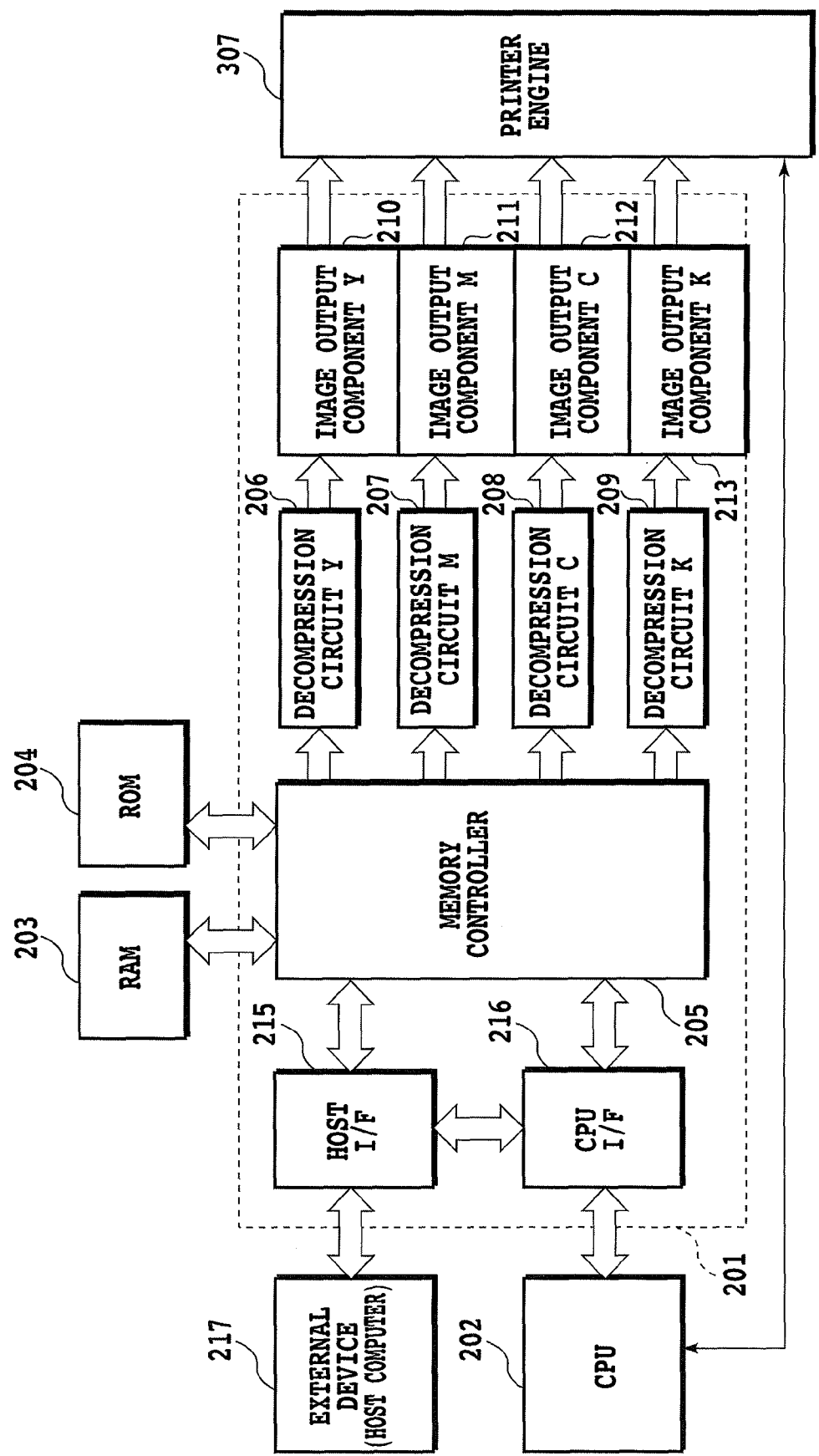
FIG. 2 is a block diagram of the printer, particularly showing the structure of a printer control unit included in the printer.

The printer control unit (controller) 101 of the aforementioned printer 1 is next described in detail by referring to FIG. 2, which is a block diagram particularly showing the configuration of the printer control unit 101.

In FIG. 2, compressed image data is entered into a host interface 215 (HOST I/F) from an external device 217.

A CPU 202 executes a control program loaded in a ROM 204 and controls the whole printer.

A RAM 203 offers a region for storing data to be recorded for printing, the data being sent in from the host computer. The RAM 203 is also a working memory that offers a region acting as a working area necessary for the CPU 202 to perform various kinds of control.

The ROM 204 stores various kinds of programs (firmware) to be executed by the CPU 202.

An ASIC (application-specific integrated circuit) 201 includes the host interface 215, a CPU interface 216, a memory controller 205, data decompression circuits 206, 207, 208, 209, and image output components 210, 211, 212, 213.

The host interface 215 exchanges control signals and data with the host computer being an external device through an interface cable. With respect to reception of data, received data is stored in the RAM 203 under DMA control simultaneously with the operation of the memory controller 205.

The CPU interface 216 literally controls the interfacing with the CPU 202 and provides control of access to a control register and a data register (not shown) included in the ASIC.

The memory controller 205 is a block for controlling access to the ROM 204 and RAM 203 and providing control of DMA transfer of data between various blocks and arbitrations.

The data decompression circuits 206, 207, 208, and 209 have means for receiving compressed image data outputted from the RAM 203 according to the result of arbitration performed by the memory controller 205 in response to a request signal outputted from the decompression circuits.

There are the four data decompression circuits for yellow (Y), magenta (M), cyan (C), and black (K), respectively. The data decompression circuits decompress the compressed image data transferred from the RAM 203 and output the decompressed image data to a printer engine 307 via the image output components 210, 211, 212, and 213, respectively.

The CPU 202 grasps the status of an image formation component including the development units and the fixing unit 110 by exchanging commands and a signal indicating the status with the image formation component at regular intervals at all times. Furthermore, the CPU 202 performs processing for sending instructions such as a print command to the image formation component. Of course, the above-described compressed image data does not always arise from the external device. The compressed image data may also be obtained by receiving print information (such as character codes) or pattern data and rendering the information or pattern under control of the CPU 202.

Figure 3:
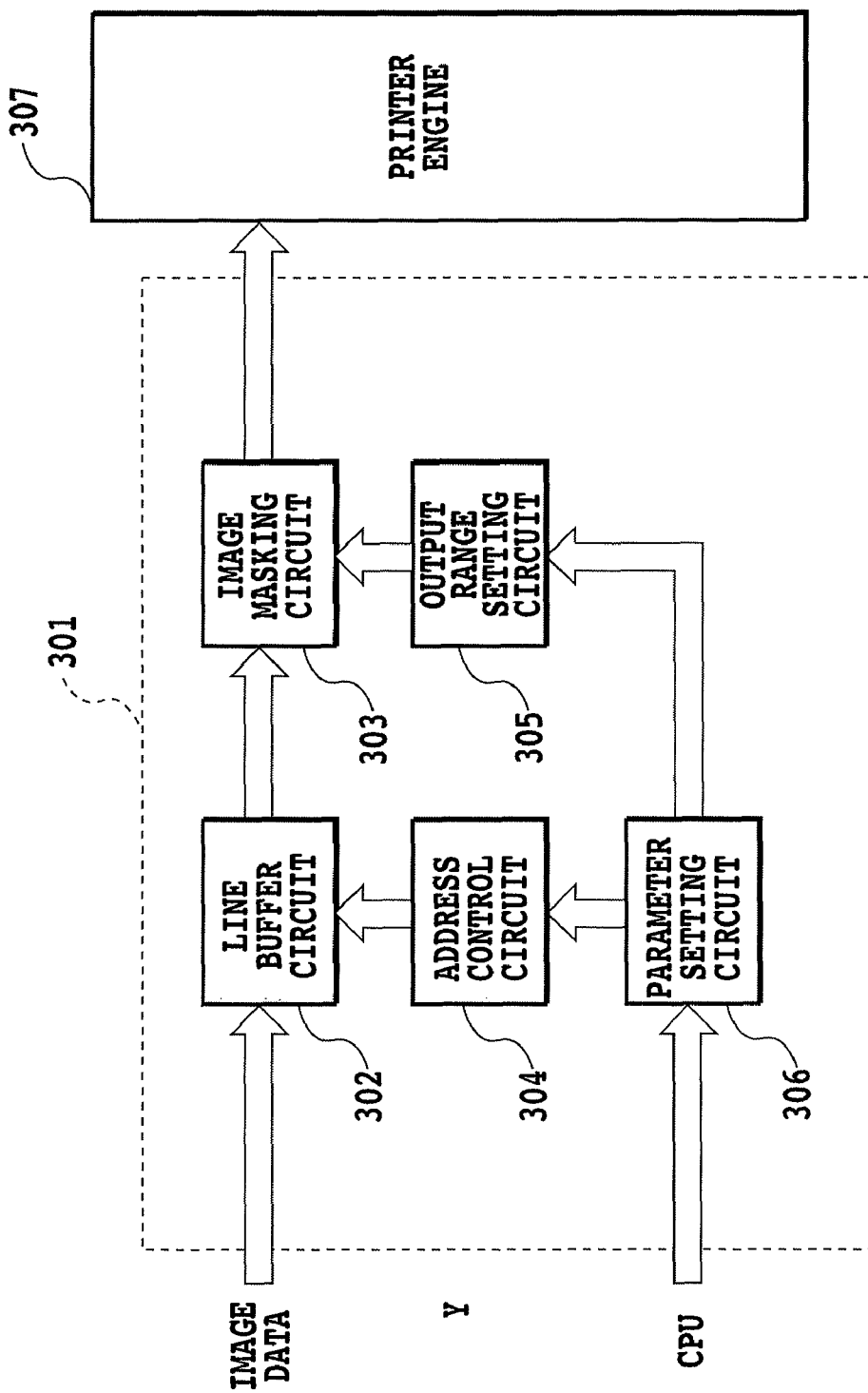
FIG. 3 is a block diagram of the printer control unit, particularly showing the structure of one image output component included in the printer control unit.

Details of the configuration of one image output component are described by referring to FIG. 3.

FIG. 3 is a block diagram showing the details of the configuration of an image output component 301 corresponding to the image output component 210 of FIG. 2.

In the figure, a line buffer circuit 302 stores image data outputted from the data decompression circuit 206 of FIG. 2.

The image output component includes a parameter setting circuit 306 consisting of a register circuit for storing various parameters.

An address control circuit 304 controls the reading position of the line buffer circuit 302 from the parameters set into the parameter setting circuit 306.

An output range setting circuit 305 acts as a control circuit for controlling the set range of image output for each line.

An image masking circuit 303 outputs an image in a range set by the output range setting circuit 305.

As described so far, the image output component 301 is made up of the circuits described above.

Figure 4:
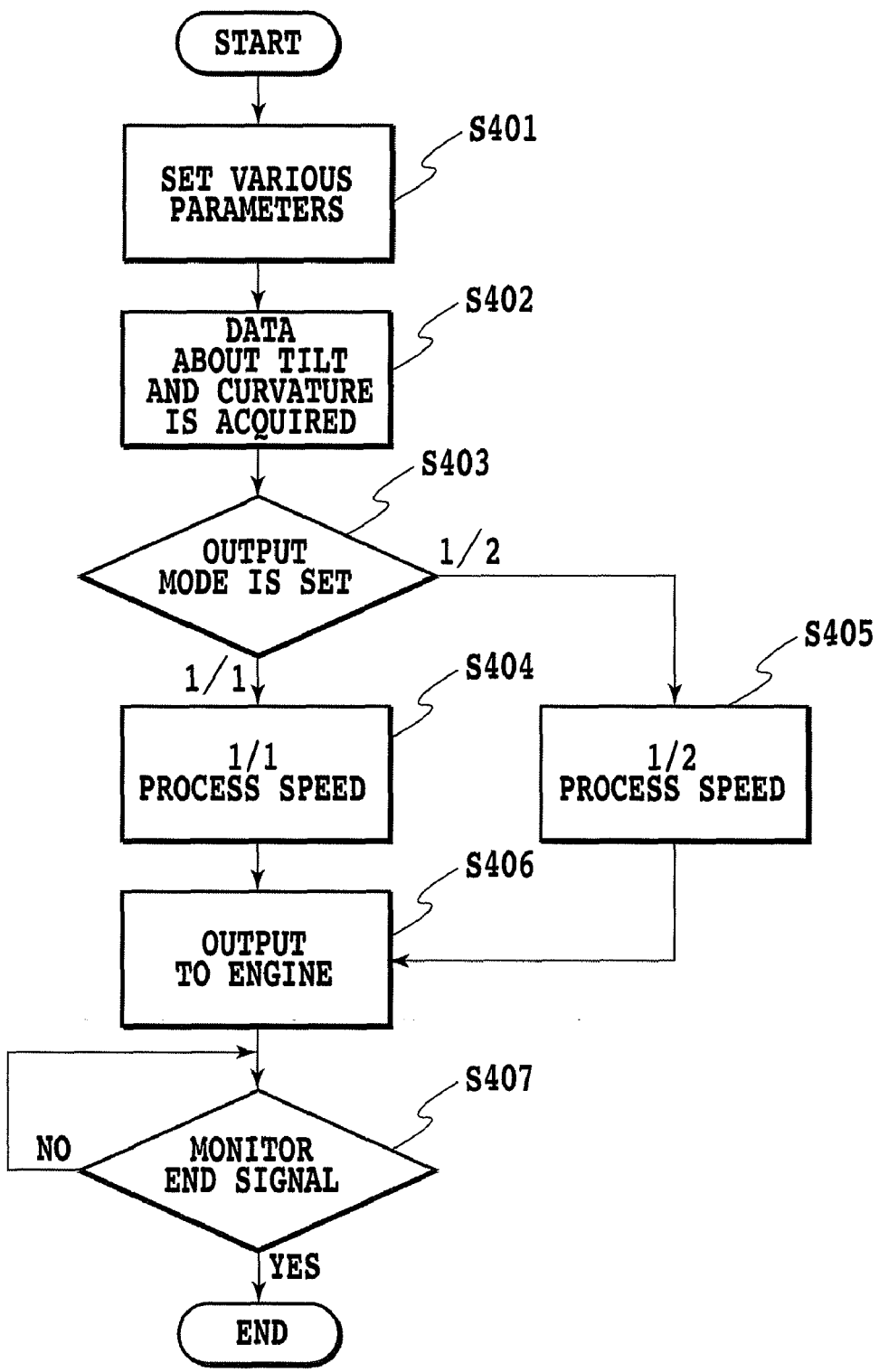
FIG. 4 is a flowchart illustrating a sequence of operations of Embodiment 1 of the invention.

The operation of the present embodiment is next described by referring to the flowchart of FIG. 4.

First, where the host computer initiates printing, the host computer creates image data. Then, the computer compresses the created image, which is entered into the printer through the interface. Of course, similar operations are carried out in a case where the printer body 1 starts printing, except that the processing is carried out by the printer body 1 instead of by the host computer.

(S401)

The printer first receives various parameters necessary for the printing and makes settings (step S401).

(S402)

The printer engine has a storage device in which information about the tilt and curvature of the optical system is stored. The information is sent from the storage device to the host computer via the controller (step S402). The host computer acquires the information in this way. The host computer calculates (acquires) the amount of misregistration based on the information about the tilt and curvature, the information being sent in from the printer. Furthermore, the host computer calculates a scan line changing point for correcting the misregistration, based on the amount of misregistration.

(S403)

In step S403, the host computer sets the process speed of the printer engine to 1/2 or 1/1 in response to the output mode of the outputted image.

The timing at which image data is outputted for each value of the process speed is described for two cases. The 1st case is a case where the tilt and curvature of the optical system is not corrected by a modification based on a scan line changing point about the original image data. The 2nd case is a case where the tilt and curvature of the optical system is corrected by a modification based on a scan line changing point about the original image data.

Figure 5:
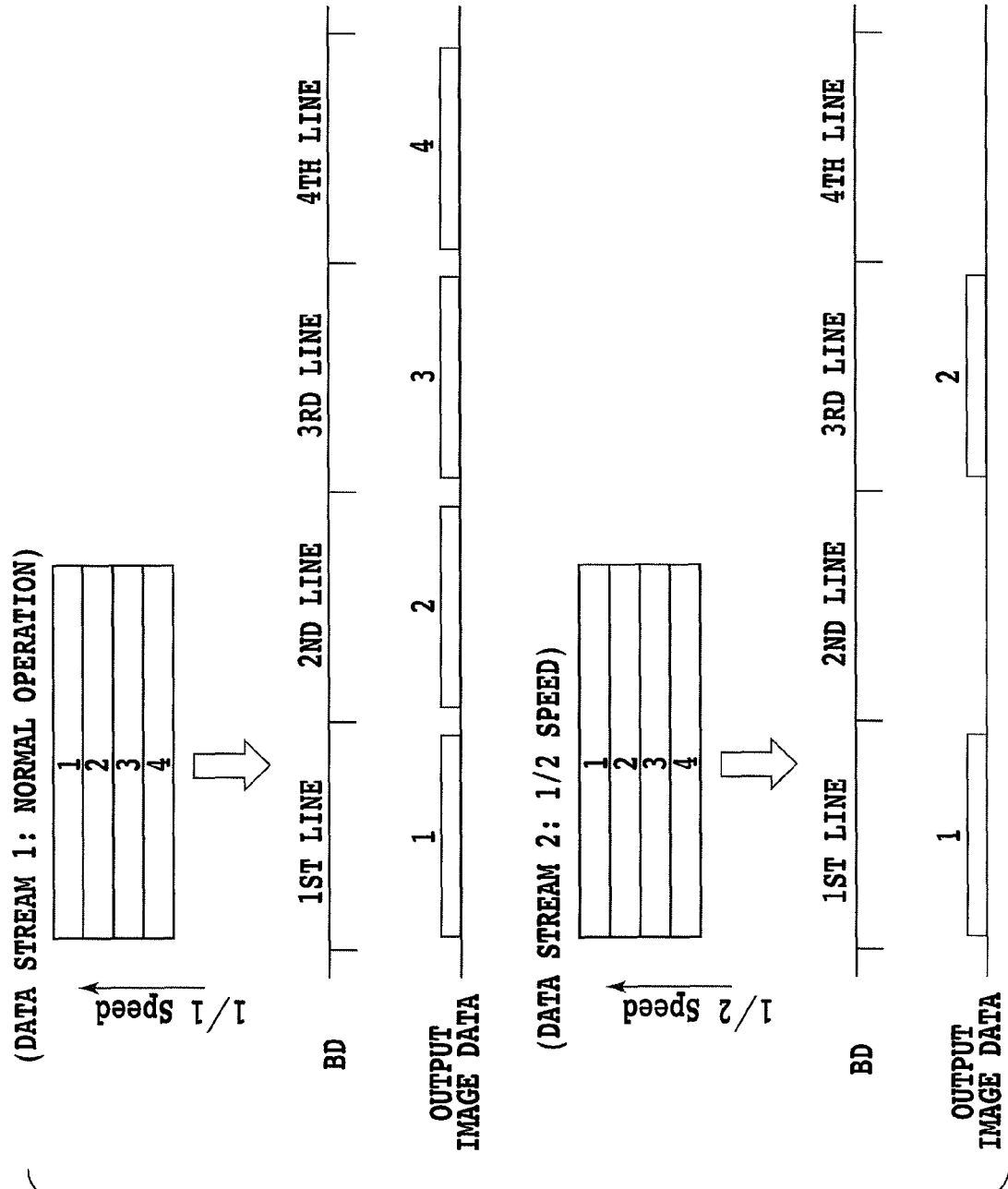
FIG. 5 is a timing chart illustrating operations performed in normal mode of operation and at a 1/2 process speed, and in which conventional correction is not made.

FIG. 5 is a timing chart of outputting of image data in the case where the tilt and curvature of the optical system are not corrected by a modification to the image.

At the 1/1 process speed of FIG. 5, one line of image data is outputted to the printer engine for each BD in response to a BD signal that is a timing signal in the primary scanning direction. Consequently, an image is formed and thus printing is performed.

At the 1/2 process speed of FIG. 5, BD has the same period as the 1/1 process speed but a 1/2 process speed mode is achieved by setting the paper feeding speed to 1/2 speed. The 1/2 process speed mode is used to prevent peeling of the toner and to enhance the fixability when printing is performed on thicker paper providing low fixability, coated paper being special paper, glossy film, and OHP sheet. In addition, when printing is performed on small-sized papers such as postcards and envelopes, this mode is used to suppress temperature elevation at the ends of the heater.

As indicated by the "data stream 2" in FIG. 5, the speed in the vertical scanning direction is halved and so image data is outputted to the printer engine at the timing of the BD signal for each odd-numbered line. Consequently, an image is formed.

Figure 6:
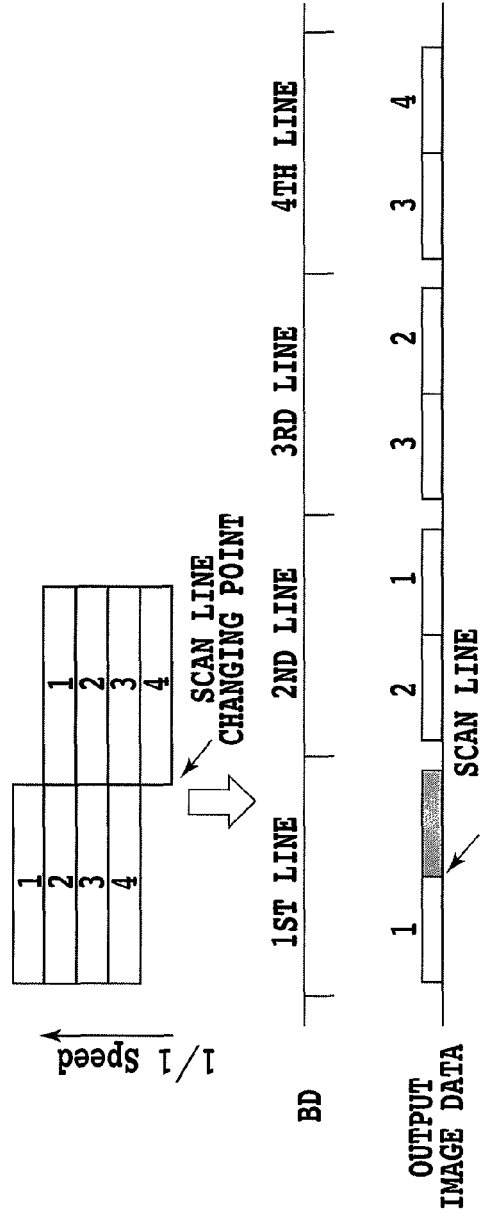
FIG. 6 is a timing chart illustrating output control performed in normal mode of operation and at the 1/2 process speed, and in which conventional correction is made.
Figure 6:
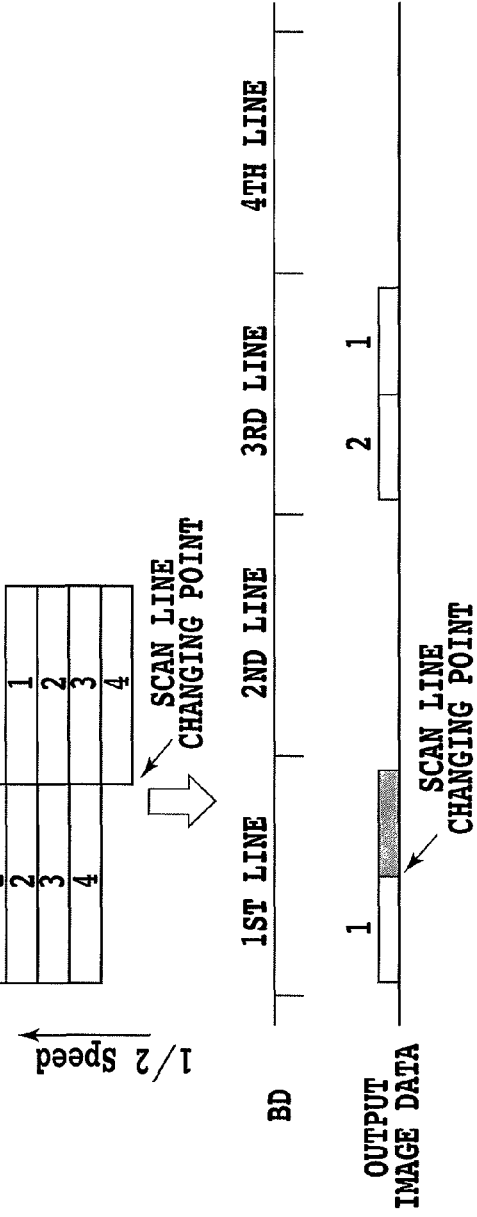

The case where the tilt and curvature of the optical system is corrected by a modification based on a scan line changing point about the original image data is next described. FIG. 6 shows the related art timing at which image data is outputted in a simplified case in which there is only one scan line changing point, the image data being produced by correcting the tilt and curvature of the optical system by modifying the data about the original image. In this case, the image is converted according to the scan line changing point by the host computer or controller that produces an image.

For example, as indicated on the second line of "data stream 3" in FIG. 6, image data is created such that image data about the former half of the second line proper is first outputted and that image data about the latter half of the first line proper is outputted after the scan line changing point. Regarding the oblique line of the first line, "white" is outputted.

In FIG. 6, "data stream 4" indicates the timing at which image data is outputted in the 1/2 process speed mode. In the same way as in the "data stream 2" shown in FIG. 5, image data is outputted on each odd-numbered line. The theory of "scan line changing" is the same as the theory already described in connection with the aforementioned "data stream 3".

(S404)

In step S403, the process speed is set according to the paper type and size. In step S404, control is provided at the 1/1 process speed. In step S405, control is provided at the 1/2 process speed.

Figure 7:
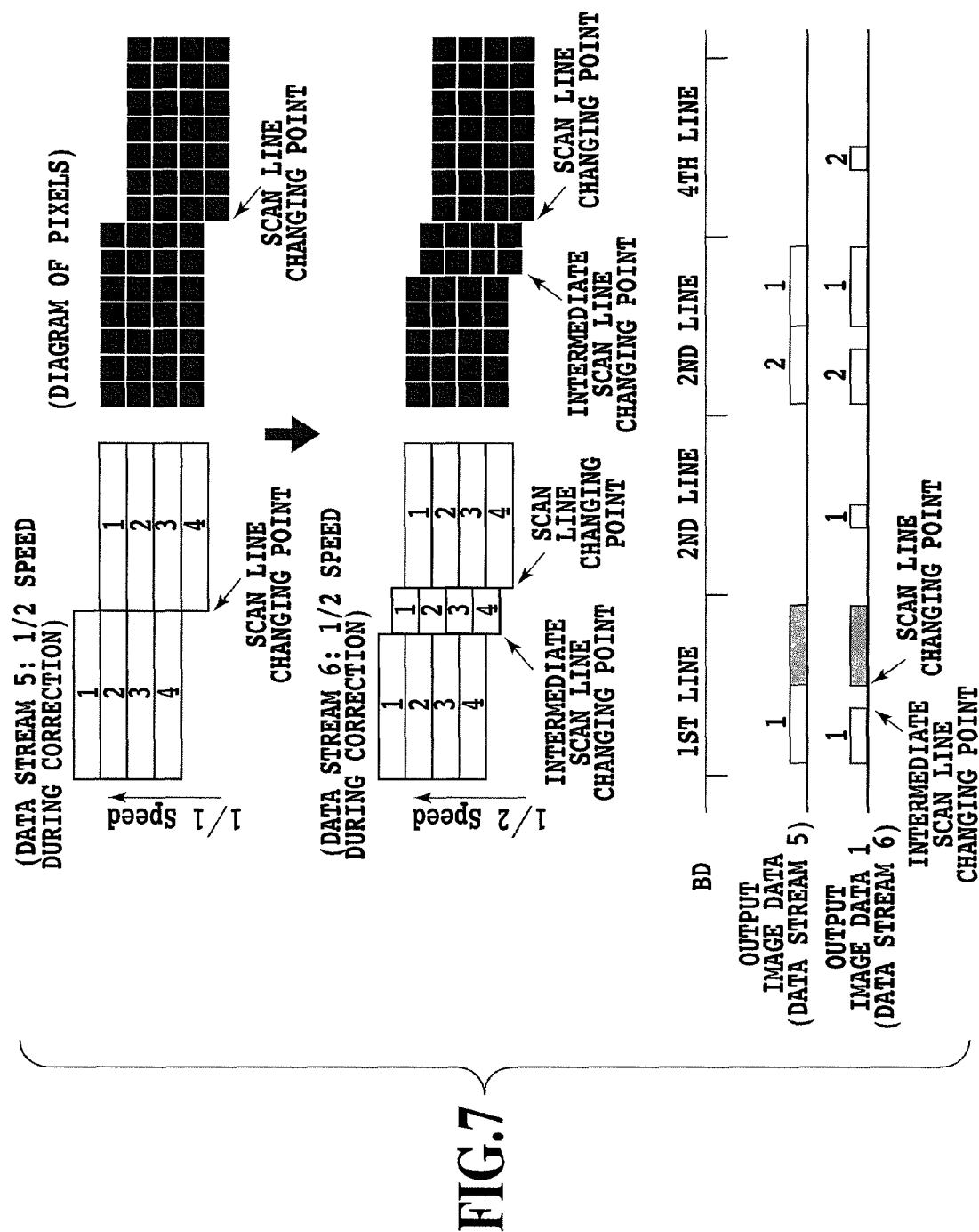
FIG. 7 is a timing chart illustrating output control performed at the 1/2 process speed in Embodiment 1.

The timing at which image data is outputted at the 1/2 process speed is described in further detail by referring to FIG. 7 for a case where the tilt and curvature of the optical system is corrected by a modification to the original image.

FIG. 7 is a timing chart illustrating control of outputting at the 1/2 process speed in the present embodiment.

In FIG. 7, "data stream 6" illustrates the case where an intermediate scan line changing point is set ahead of the scan line changing point.

In the present embodiment, image data is outputted to the printer engine at the timing at which image data present between the intermediate scan line changing point and the scan line changing point is divisionally outputted on even-numbered lines not used normally (see the output image data 1 in FIG. 7). As a result, image data outputted to the even-numbered lines is printed between the odd-numbered lines located between the even-numbered lines when the image data is printed by the printer engine.

In the "data stream 5" of FIG. 7, there is a difference of 1 pixel in vertical step across the scan line changing point. In contrast, in "data stream 6" of FIG. 7, there is a difference of a half pixel in vertical step between the scan line changing point and the intermediate scan line changing point.

(S406)

If the process speed is set to 1/2 process speed in step S405, image data begins to be outputted to the printer engine in step S406.

At this time, the image data outputted from the data decompression circuit shown in FIG. 2 is once stored in the line buffer circuit 302 shown in FIG. 3.

The image data stored in the line buffer circuit 302 is outputted to the image masking circuit 303. At this time, reading from the line buffer is controlled as already described in connection with FIG. 7.

Figure 8:
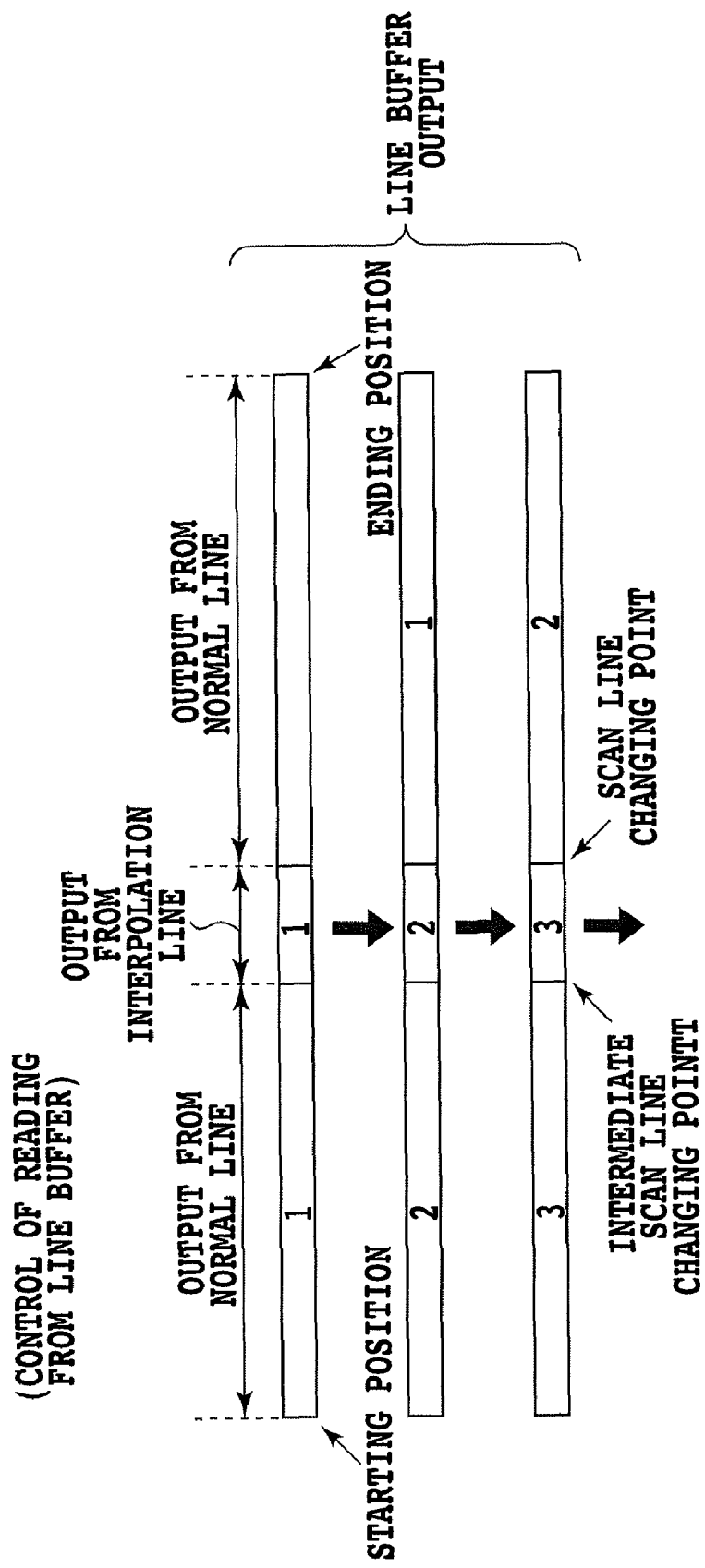
FIG. 8 is a diagram illustrating control of reading from a line buffer in Embodiment 1.

The control of the reading from the line buffer is now described by referring to FIG. 8, which is a diagram illustrating control of the reading from the line buffer.

In the present embodiment, as shown in FIG. 8, when the process speed is the 1/2 process speed, image data is read out (such as indicated by 2) on the odd-numbered lines (normal lines). When the reading point has reached the intermediate scan line changing point, the reading is interrupted. Counting is performed to permit the reading point to be advanced to the scan line changing point, whereupon the image data (such as indicated by 1) to be used this time is started to be read out.

On the even-numbered lines (interpolation lines), reading reverse to the foregoing reading is done. That is, reading is kept interrupted until the intermediate scan line changing point is reached. Counting is performed to advance the reading point. When the intermediate scan line changing point is reached, image data to be outputted is read out on the interpolation lines. When the scan line changing point is reached, the reading is again interrupted. Counting is performed to advance the reading point. The printer waits until the next odd-numbered line is reached. In this way, image data can be outputted to the printer engine at the timing illustrated in FIG. 7.

(S407)

When outputting of image data to the printer engine is started, a determination is made as to whether one page of image data has been sent (step S407). If the determination is YES, the processing is ended. Then, the engine forms an image. As described so far, in a case where an image is printed at the 1/2 process speed, the image can be corrected accurately according to the tilt and curvature of the optical system by outputting the image at the timings of the even-numbered lines at which image data is not outputted per se.

Embodiment 2

Figure 9:
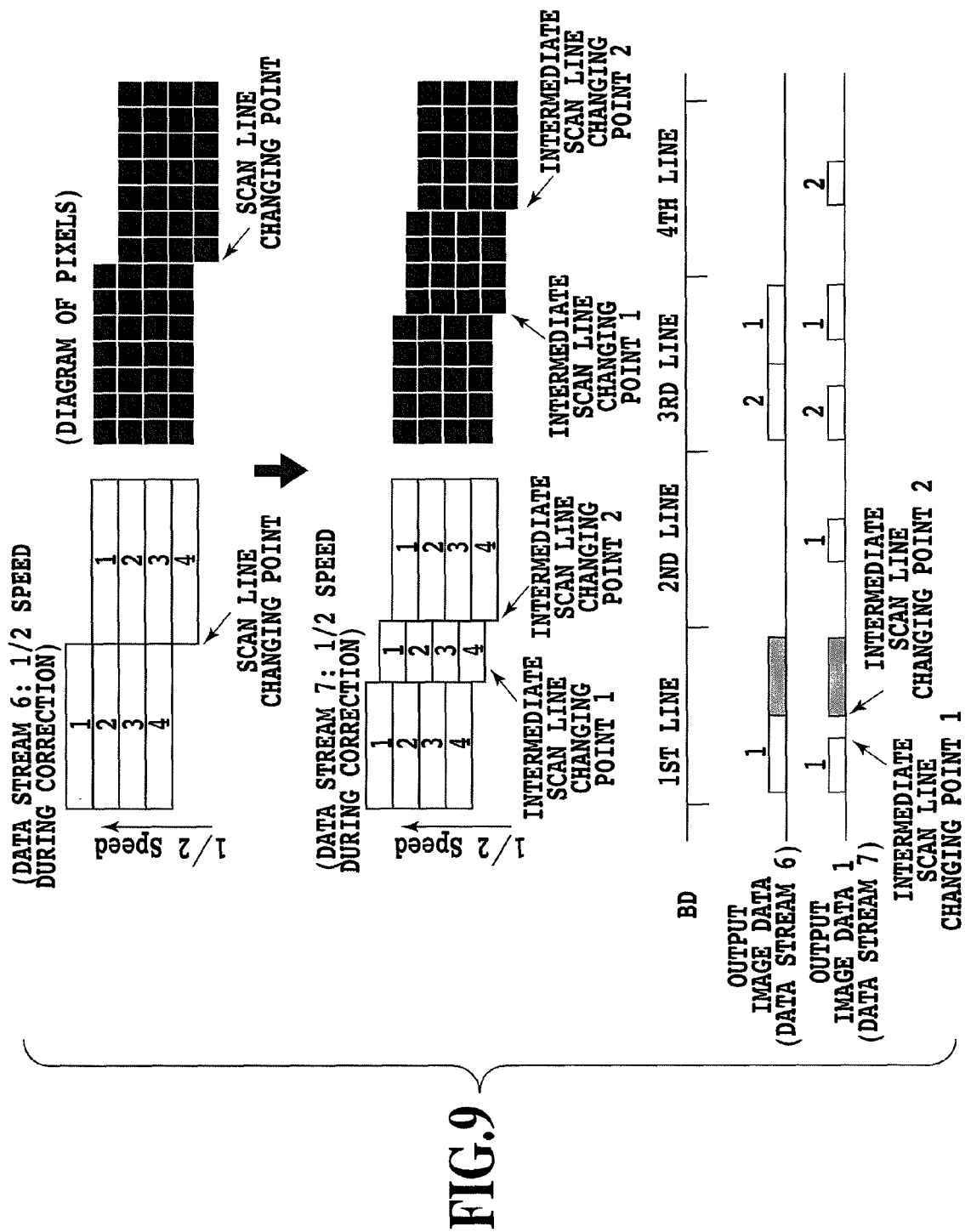
FIG. 9 is a timing chart illustrating output control at the 1/2 process speed in Embodiment 2.

In the aforementioned Embodiment 1, the scan line changing point and the intermediate scan line changing point preceding the scan line changing point are set as illustrated in FIG. 7. This sets the output range of image data to be divisionally outputted to the even-numbered lines. However, regarding some kinds of output image, the position of the scan line changing point of Embodiment 1 may be placed between such intermediate scan line changing points as in "data stream 7" shown in contrast with the "data stream 6" of FIG. 9. That is, an anteroposterior range of the scan line changing point may be set as the output range of image data to be divisionally outputted.

In this case, intermediate scan line changing points 1 and 2 may be set. Image data present between the intermediate scan line changing points 1 and 2 may be controlled to be outputted to the even-numbered lines. Of course, image data present between the scan line changing point and scan line changing point 2 may be controlled to be outputted to the even-numbered lines according to the output image. It would be obvious to those skilled in the art that the output control can be implemented by a technique similar to the output control method of Embodiment 1.

Embodiment 3

Figure 10:
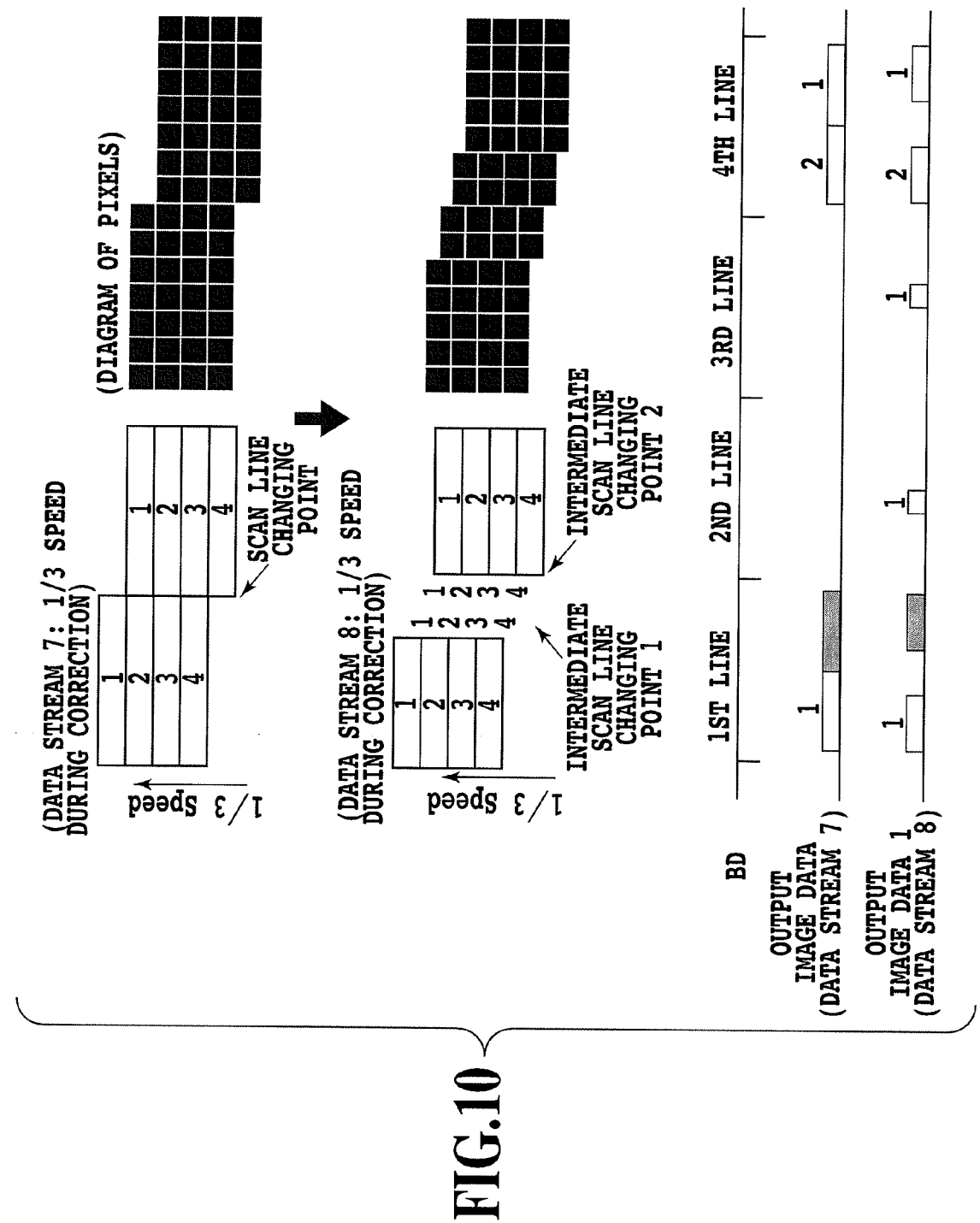
FIG. 10 is a timing chart illustrating output control at a 1/3 process speed in Embodiment 3.

In the above-described Embodiment 1, the control method determines at what timing image data is outputted to the printer engine at the 1/2 process speed as illustrated in FIG. 7. In contrast, FIG. 10 illustrates the timing at which image data is divisionally outputted at a 1/3 process speed. In the case of this process speed, outputting of segments of image on the second and third lines is controlled relative to the segment of image on the first line as in the output image data 1. Consequently, an image having less steps (i.e., a smoother image) can be printed. It would be obvious to those skilled in the art that this specific control can be implemented by a technique similar to the output control method of Embodiment 1 except that there are two interpolation lines and that desired image data is divisionally outputted to each interpolation line.

Embodiment 4

In Embodiment 1 described above, image data outputted to the odd- and even-numbered lines are controlled by controlling image data read from the line buffer as already described in connection with FIG. 8.

Figure 11:
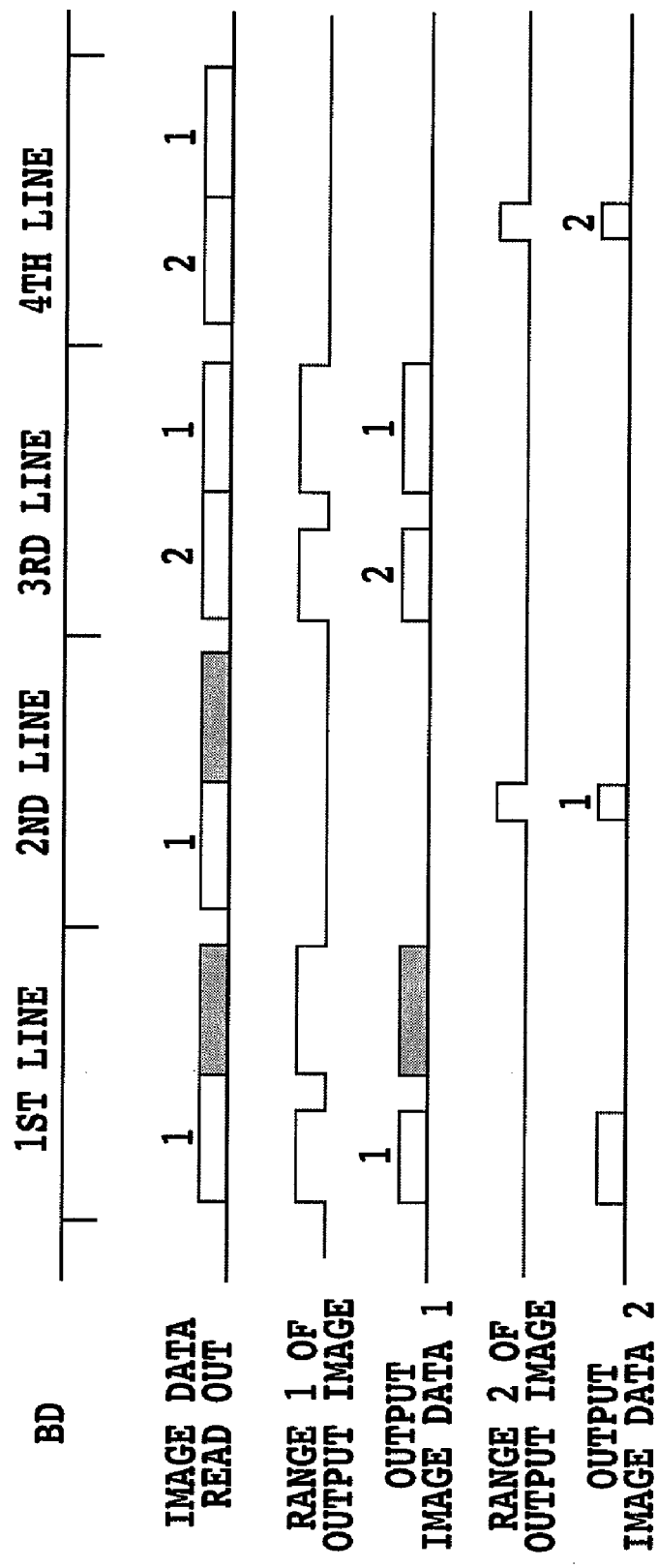
FIG. 11 is a timing chart illustrating output control at the 1/2 process speed in Embodiment 4.
Figure 12:
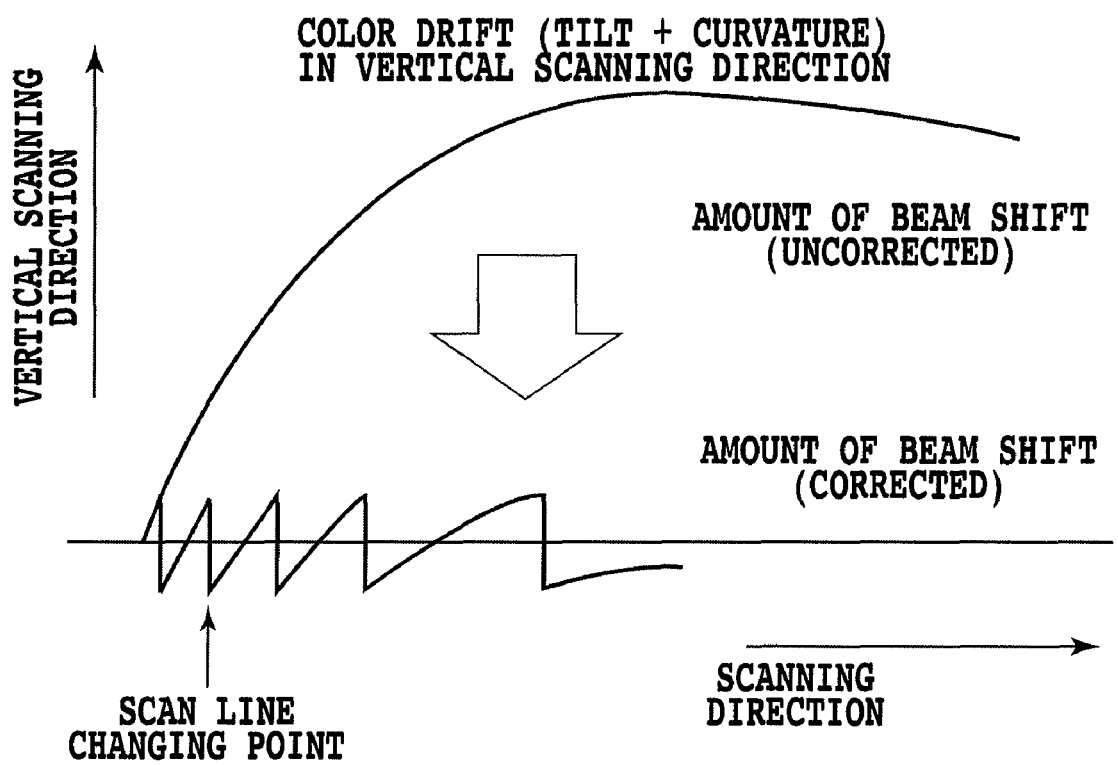
FIG. 12 is a diagram illustrating one conventional scan line changing processing.
Figure 13:
FIG. 13 is a diagram illustrating another conventional scan line changing processing.
Figure 13:
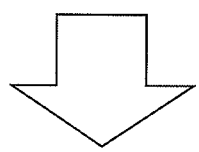
Figure 13:
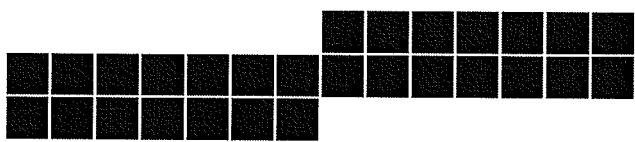

In FIG. 11, with respect to image data read from the line buffer, image data read out on each odd-numbered line is always the same as image data read out on each even-numbered line.

In this case, the image masking circuit 303 of FIG. 3 can yield effects equivalent to the effects of Embodiment 1 by controlling of a mask area the effective range of each set of image data as image output ranges 1 and 2 shown in FIG. 3, the set of image data being outputted to the printer engine on odd- and even-numbered lines.

Other Embodiments

The object of the invention is achieved also by preparing a storage medium on which program codes for achieving the sequence of the flowchart described in the above embodiments are stored and causing a computer, CPU, or MPU in the system or apparatus to read the program codes from the storage medium for executing the program.

In this case, the program code set itself read from the storage medium permits the computer to achieve the functions of the above-described embodiments. Therefore, the program code set and the computer-readable storage medium on which the program code set is stored constitute embodiments of the invention.

Examples of the storage medium for supplying the program code set include floppy (trademark registered) disk, hard disk, optical disk, magnetooptical disk, CD-ROM, CD-R, magnetic tape, nonvolatile memory card, and ROM.

The functions of the aforementioned embodiments can be accomplished by causing the computer to execute the program read out. The execution of the program includes the case in which the OS running on the computer performs all or part of the actual processing under the instructions of the program.

Furthermore, the functions of the above-described embodiments can be accomplished by a function extension board inserted into the computer or by a function extension unit connected with the computer. In this case, a program read from the storage medium is first written into a memory equipped either in the function extension board inserted in the computer or in the function extension unit connected with the computer. Then, a CPU equipped in the function extension board or function extension unit performs all or part of the actual processing under instructions of the program. Processing performed by the function expansion board or function expansion unit makes it possible to accomplish the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-122624, filed May 8, 2008, which is hereby incorporated by reference herein in its entirety.

What is claimed is:

1. An image forming apparatus comprising:
    an acquisition unit configured to acquire an amount of misregistration from data indicating amounts of tilt and curvature of an optical system for each color;
    a correction unit configured to correct image data at a scan line changing point based on the acquired amount of misregistration; and
    a printing unit configured to print the corrected image data at a process speed in a vertical scanning direction, the process speed being set according to a type of paper to be printed,
    wherein the correction unit corrects the amount of misregistration by divisionally outputting a part of one line of image data when the process speed in the vertical scanning direction is lower than a normal process speed in the vertical scanning direction.

2. An image forming apparatus as set forth in claim 1, wherein the divisionally outputted image data is in a range located between the scan line changing point and a point existing ahead of or behind the scan line changing point.

3. An image forming apparatus as set forth in claim 1, wherein the divisionally outputted image is in an anteroposterior range of the scan line changing point.

4. A method of controlling an image forming apparatus, comprising the steps of:
    acquiring an amount of misregistration from data indicating amounts of tilt and curvature of an optical system for each color;
    correcting image data at a scan line changing point based on the acquired amount of misregistration; and
    printing the corrected image data at a process speed in a vertical scanning direction, the process speed being set according to a type of paper to be printed,
    wherein the correcting step corrects the amount of misregistration by divisionally outputting a part of one line of image data in a case where the process speed in the vertical scanning direction is lower than a normal process speed in the vertical scanning direction.

5. A method of controlling an image forming apparatus as set forth in claim 4, wherein the divisionally outputted image data is in a range located between the scan line changing point and a point existing ahead of or behind the scan line changing point.

6. A method of controlling an image forming apparatus as set forth in claim 4, wherein the divisionally outputted image data is in an anteroposterior range of the scan line changing point.

7. A computer-readable recording medium having computer-executable instructions for performing a method of controlling an image forming apparatus, the method comprising the steps of:
    acquiring an amount of misregistration from data indicating amounts of tilt and curvature of an optical system for each color;
    correcting image data at a scan line changing point based on the acquired amount of misregistration; and
    printing the corrected image data at a process speed in a vertical scanning direction, the process speed being set according to a type of paper to be printed,
    wherein the correcting step corrects the amount of misregistration by divisionally outputting a part of one line of image data in a case where the process speed in the vertical scanning direction is lower than a normal process speed in the vertical scanning direction.

* * * * *